July 10, 1923.
A. E. VOSBURG ET AL
1,461,202
BORING BAR AND THE LIKE
Filed April 26, 1922    2 Sheets-Sheet 2
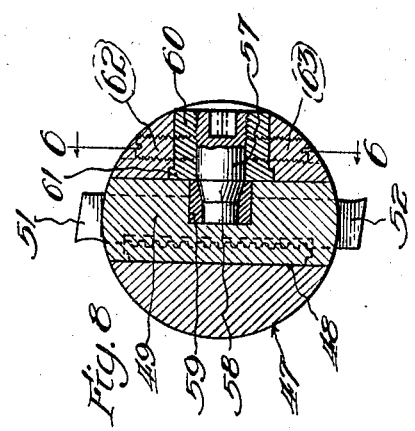
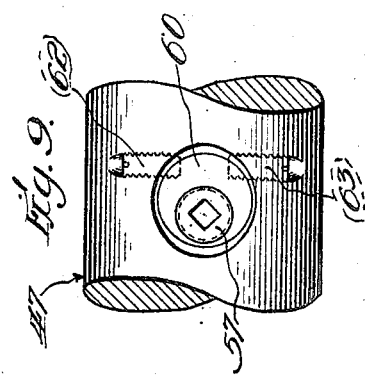
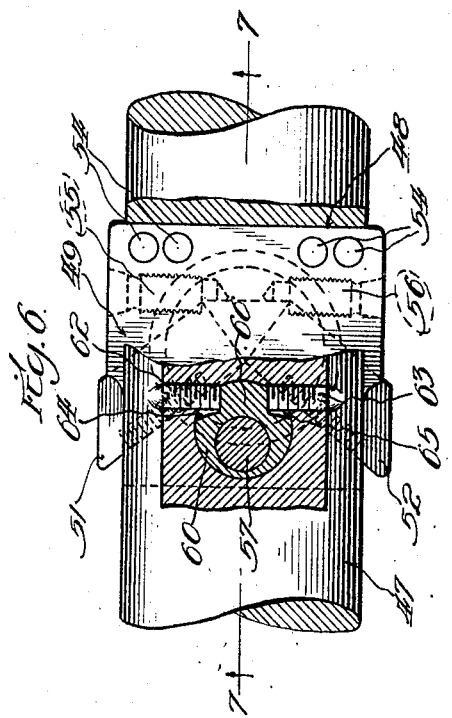
Inventor
Alan E. Vosburg,
Robert B. Whitney.
By Lanway & Lanway Attys.

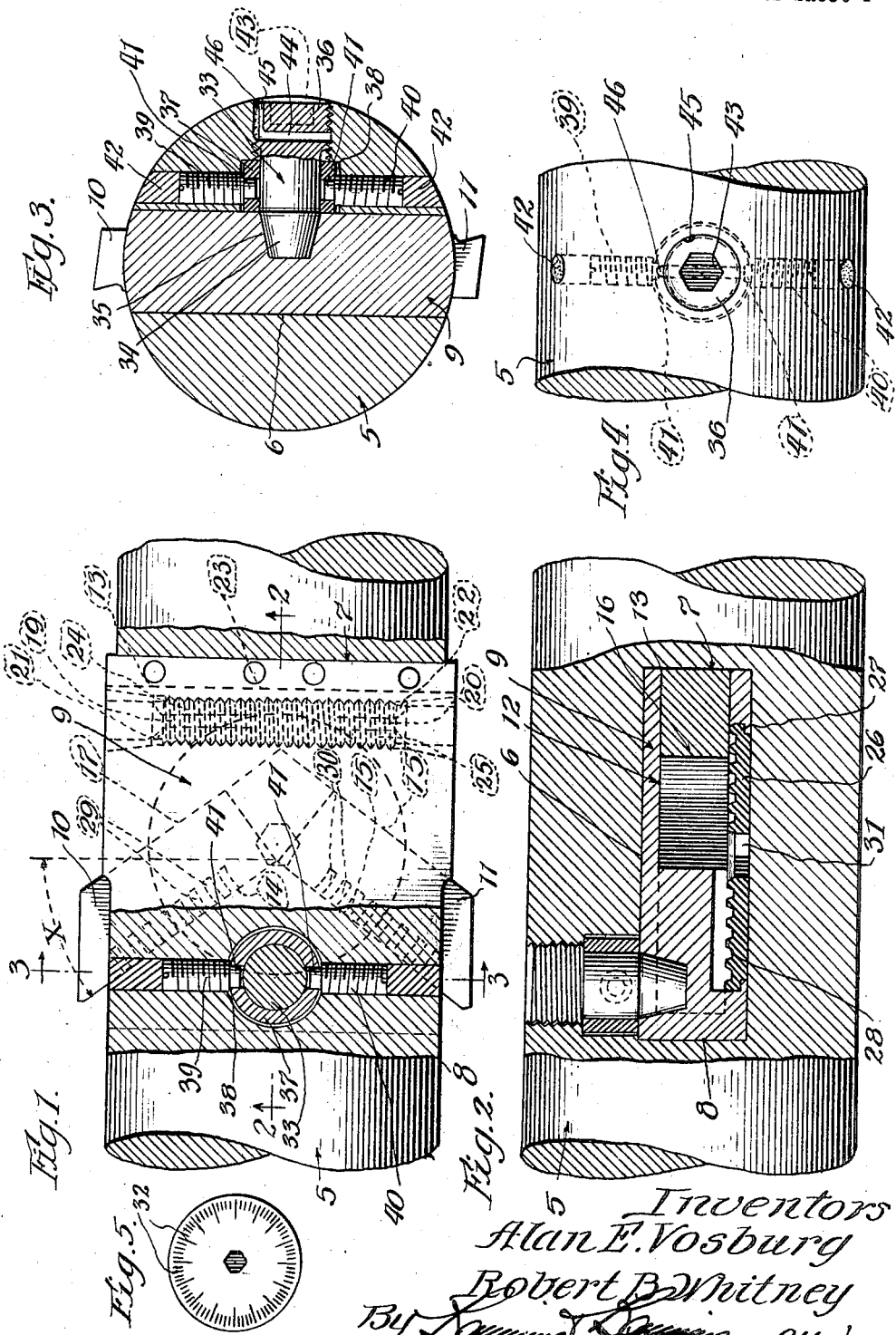

Patented July 10, 1923.

1,461,202

UNITED STATES PATENT OFFICE.

ALAN E. VOSBURG AND ROBERT B. WHITNEY, OF DETROIT, MICHIGAN, ASSIGNORS TO ARTHUR V. HANNIFIN, OF CHICAGO, ILLINOIS.

BORING BAR AND THE LIKE.

Application filed April 26, 1922. Serial No. 556,775.

*To all whom it may concern:*

Be it known that we, ALAN E. VOSBURG and ROBERT B. WHITNEY, both citizens of the United States, and both residing at Detroit, in the county of Wayne and State of Michigan, have invented certain new and useful Improvements in Boring Bars and the like, of which the following is a specification.

This invention has to do with certain improvements in boring bars. It has to do generally with improvements in the construction and operation of boring bars, and also has to do more particularly with the manner in which the cutting tools are adjusted and supported within the boring bar.

One of the features of the invention relates to an improved arrangement for centering the cutting tools with respect to the boring bar, so that they will both properly perform their work, and so that the gauge to which they are set can be accurately adjusted, and also so that the operator will have assurance that the cutting tools are both operating to the desired gauge.

More particularly the invention relates to improvements in that type of boring bar construction in which the cutting tools are mounted within a tool block, which tool block may be readily set into or removed from the boring bar itself, the tool block being provided with means for locking the tools in the desired position of adjustment, and also being sometimes provided with a simple form of means for adjusting the tools within the tool block to the desired gauge before they are locked.

In connection with the foregoing an object is to provide an arrangement whereby the tool block itself may be accurately centered with respect to the boring bar, so that after the tools have been preliminarily adjusted and locked within the tool block, the tool block, including the tools, may then be set into the boring bar and locked therein with assurance that both of the tools are properly centered with respect to the boring bar.

Another object in connection with the foregoing is to provide an arrangement whereby the centering device for the tool block may itself be exactly centered within the boring bar and locked in centered position and then sealed, so that in the original manufacturing processes, the cost of production may be lowered without any impairment of the accuracy of the machine in its final form.

Still another object in connection with the foregoing is to provide an arrangement such that the same device which is ordinarily used for centering and securing the tool block within the boring bar may also be used, if desired, for permitting the boring bar to be operated for what is known a "float reaming" operation.

Other objects and uses of the invention will appear from a detailed description of the same which consists in the features of construction and combinations of parts hereinafter described and claimed.

In the drawings:

Figure 1 shows a section of a boring bar embodying the features of the present invention, a portion of the boring bar being broken away in order to show the presence of a tool block, and a portion of the tool block being broken away so as to show the centering and locking arrangement in detail;

Fig. 2 shows a view at right angles to that of Fig. 1;

Fig. 3 shows a section taken on line 3—3 of Fig. 1, looking in the direction of the arrows;

Fig. 4 shows a fragmentary view of a boring bar similar to that of Fig. 1 with the exception that the portion of the boring bar within which is located the centering and locking pin is shown in elevation instead of in section;

Fig. 5 shows a detail face view of a scroll plate for adjusting the positions of the tools;

Fig. 6 shows a view similar to that of Fig. 1, but illustrates a modified form of construction;

Fig. 7 shows a section taken on the line 7—7 of Fig. 6, looking in the direction of the arrows;

Fig. 8 shows a section on the line 8—8 of Fig. 7, looking in the direction of the arrows; and Fig. 9 shows a fragmentary view similar to Fig. 6, but in elevation instead of in section.

The boring bar proper is designated by the numeral 5. It is provided with a transverse slot 6 having the end walls 7 and 8. Within this slot there is removably mounted a tool block 9, which, in turn, carries the cutting tools 10 and 11. The particular tool block illustrated in the drawing is itself slotted, as shown in Fig. 2, to provide the slot 12, the back wall 13 of said slot extending in a radial direction, and the front walls 14 and 15 of said slot extending outwardly away from the wall 13 at equal angles with respect to the axis of rotation, as is clearly evident from Fig. 1.

A locking block 16 is seated within the slot 12 of the tool block. This locking block is provided with a straight back face and with angular front faces 17 and 18 which extend parallel to the faces 14 and 15 of the slot 12 when the locking block is set into said slot. The clearance between the walls 14 and 17 and 15 and 18 respectively, is just sufficient to accommodate the tools of the thickness to be used in the tool block.

The locking block itself is provided with a pair of inwardly extending slots 19 and 20, which slots, at its opposite sides, have the fins 21 and 22, as shown in Fig. 1, the fins being joined together and to the remaining portions of the locking block by a central web 23. These fins are more or less flexible, so that by tightening up the locking screws 24 and 25, the tools will be clamped in place within the tool block.

By setting the locking block 16 at the other end of the slot 12 so as to bring its angular faces 17 and 18 against the walls 14 and 15, it will be possible to insert straight cutting tools within the tool block and behind the locking block, so that the arrangement can be reversibly used for either class of tools. In one face of the tool block 9 there is a circular socket within which is located a circular scroll plate 26. This scroll plate has a peripheral shoulder 27 by means of which it is held in place within the tool block. The face of the scroll plate 26 is provided with a spiral thread 28. and on the upper faces of the tools 10 and 11 there are provided companion thread sections 29 and 30. By rotation of the scroll plate, the tools 10 and 11 are simultaneously moved either towards or from each other so as to bring them into desired adjustment within the tool block whreupon they can be locked by tightening up the screws 24 and 25. The rotation of the scroll plate 26 may be easily accomplished by the use of a key inserted into a recess 31 of the scroll plate when the tool block is removed from the boring bar.

As shown in Fig. 5 the scroll plate may be provided in its outer face with a series of graduations 32 which may be compared with a mark on the tool block itself in order to show the amount through which the scroll plate is rotated. Manifestly the rotation of the scroll plate through a certain angle will effect a different amount of change in the cutting diameter of the tools when said tools travel radially than will be the case when the tools travel on an angle such as that shown in Fig. 1. When the tools travel in a radial direction, their change in cutting diameter will be equal to their combined movement as dictated by the scroll plate; but when the tools are set at an angle as is the case in Fig. 1, the change in the cutting diameter will only be equal to the cosine of the angle which they bear with respect to the radial direction multiplied by the actual amount of their combined movement. As a matter of convenience the graduations 32 on the scroll plate should indicate either a definite amount of adjustment of the cutting diameter measured in inches or centimeters, or a multiple thereof. By making the angle X between the wall 14 or 15 and the true radial direction equal to 36° 52′ 8″, the ratio of change in cutting diameter for angular tools as compared to change in cutting diameter for radial tools will become as 1.00 is to 1.25. Consequently we prefer to make the angle X of the amount above indicated, so that the scroll plate may be graduated to read directly the amount of change of cutting diameter for angular tools, so that the change in cutting diameter for radial tools can then be ascertained simply by multiplying by 1.25.

After the tool block with the tools adjusted and locked therein is set into the boring bar, it must be centered and locked. For this purpose we have provided a pin 33 which extends inwards through the side of the boring bar, its inner end 34 being tapered in order to wedge solidly into a tapered socket 35 in the tool block. The head 37 of the pin 33 is of enlarged size and threads into the boring bar so that the desired wedging action may be produced.

It would be a very difficult matter to exactly center the passage through which the pin 33 works in the boring bar so as to have assurance that the cutting tools will always be exactly centered when the tool block is in place. In order to exactly center the pin 33 within the boring bar, we have provided a collar 37 within a socket 38 of the boring bar. This collar is a very accurate fit for the stem of the pin 33. The collar 37 may be set back and forth within the socket 38 by the use of the opposing screws 39 and 40, which bear against its opposite sides. The inner ends of these screws are provided with the necks 41 which take into recesses in the collar. After the collar has been exactly centered and the screws 39 and 40 tightened, these screws may be covered over and sealed by lead or other suitable material 42, as shown in Fig. 3, so that the adjustment will not be tampered with by unauthorized persons.

The threaded head 36 of the pin 33 has a rather loose threading engagement with the threads of the boring bar, so that the aforementioned adjustment may be performed while maintaining the mesh of the threads of the pin 33 with the threads of the boring bar. The amount of play in the threads may be readily made sufficient to allow an adjustment of several thousandths of an inch in the position of the pin.

The pin 33 may be tightened up by a suitable key introduced into a socket 43 in its exposed face. When so tightened, the pin jams into the tool block with a wedging action. By loosening up the pin 33 a slight distance, the tool block may be allowed to "float" an amount sufficient to permit "float reaming." When the pin 33 is thus loosened, it should be secured against any further turning, as otherwise the amount of float may become excessive. We have, therefore, provided a transverse passage 44 in the head of the pin 33 which communicates with a semi-circular passage 45 leading upwardly through the periphery of the head of the pin, and have also provided another semi-circular passage 46 in the boring bar itself with which the passage 45 may be brought into register. Ordinarily when the pin 33 is tightened up to the full extent in order to lock the tool block, the passages 45 and 46 will occupy the relative positions shown in Fig. 4; whereas by backing up the pin 33 until the passage 45 is registered with the passage 46, the desired amount of play is allowed for float reaming, and thereupon a piece of soft wire or the like may be run down through the passages in order to lock the pin in this position.

Referring to the modified construction shown in Figs. 6, 7, 8 and 9, the boring bar is in this case designated by the numeral 47. It is provided with the transverse slot 48 into which is seated the tool block 49. Said tool block is in turn slotted as at 50 to receive the inner ends of the cutting tools 51 and 52, and also to receive a locking block 53. The slot 50 has its forward end faces formed at an angle as in the construction of Figs 1, 2, 3 and 4, so as to be able to receive the angular tools. The locking block 53 is of generally U-shape with its front edges lying parallel to the front walls of the slot 50. Said locking block 53 is held in place within the tool block by a series of cross pins 54. The locking block is also slotted so as to establish fins which may be expanded a slight distance by the wedge screws 55 and 56 when tightened up, to thereby lock the tools firmly within the locking block.

The tool block 49 is held in place by means of a pin 57 reaching down from the boring bar, a lower end 58 of said pin engaging accurately with the socket 59 of the tool block. Said lower end is also tapered as shown in Fig. 7, the socket 59 being correspondingly tapered, so that when the pin is forced home its lower end will wedge securely with respect to the socket 59 and thus bring the tool block to an exact center as determined by the position of the pin 57.

The pin 57 reaches down through an eccentric block 60 located within the boring bar. This block 60 is in itself of circular form and works within a circular socket of the boring bar, but the pin 57 passes down through the block 60 eccentrically, as is clearly evident from Figs. 6, 7, and 9. The eccentric block 60 is held in place within the boring bar by means of a flange 61 on its lower end.

The eccentric block 60 may be rocked back and forth within its circular socket by means of a pair of opposing screws 62 and 63 in the boring bar, which screws work into grooves 64 and 65 of the eccentric block 60, and bear against a lug 66 of the eccentric block which is thus formed.

The amount by which the centering pin 57 will be shifted to one side or the other with respect to the axis of the boring bar will, of course, depend on the amount of eccentricity of the pin 57 as compared to the center of rotation on which the block 60 is rotated. By making this eccentricity relatively small it is possible to obtain a very small movement of the position of the pin 57 with a slight rocking of the block 60, so that an extremely accurate adjustment of the centering pin is possible.

We claim:

1. In a boring bar the combination of a shaft having a transverse slot with radial end walls, a tool block seated within said slot and fully occupying the axial dimension of the slot, a pair of cutting tools mounted within the tool block, means within the tool block for adjusting said tools towards and from each other, means within the tool block for locking the tools, there being a transversely extending hole in the shaft communicating axially with the transverse slot, there being a tapered recess in the face centrally of the tool block in position to register with said hole, a centering pin extending loosely through the hole and having its inner end tapered and adapted to wedge into the recess of the tool block and having its outer end loosely in threaded engagement with the shaft, means for exactly centering the position of said pin with respect to the axis of the shaft comprising a collar mounted in the shaft and through which the pin extends in accurate fashion, and a pair of opposing screws in the shaft working on opposite sides of the collar, means for sealing over said set screws, there being an axial recess in the wall of the passage aforesaid, and there being an axial recess in the end portion of the pin, said recesses being relatively so positioned that when the pin is jammed into the recess of the tool block said recesses are out of register, substantially as described.

2. In a boring bar the combination of a shaft having a transverse slot with radial end walls, a tool block seated within said slot and fully occupying the axial dimension of the slot, a pair of cutting tools mounted within the tool block, means within the tool block for adjusting said tools towards and from each other, means within the tool block for locking the tools, there being a transversely extending hole in the shaft communicating axially with the transverse slot, there being a tapered recess in the face centrally of the tool block in position to register with said hole, a centering pin extending loosely through the hole and having its inner end tapered and adapted to wedge into the recess of the tool block and having its outer end loosely in threaded engagement with the shaft, means for exactly centering the position of said pin with respect to the axis of the shaft comprising a collar mounted in the shaft and through which the pin extends in accurate fashion, a pair of opposing screws in the shaft working on opposite sides of the collar, and means for sealing over said set screws, substantially as described.

3. In a boring bar the combination of a shaft having a transverse slot with radial end walls, a tool block seated within said slot and fully occupying the axial dimension of the slot, a pair of cutting tools mounted within the tool block, means within the tool block for adjusting said tools towards and from each other, means within the tool block for locking the tools, there being a transversely extending hole in the shaft communicating axially with the transverse slot, there being a tapered recess in the face centrally of the tool block in position to register with said hole, a centering pin extending loosely through the hole and having its inner end tapered and adapted to wedge into the recess of the tool block and having its outer end loosely in threaded engagement of the shaft, means for exactly centering the position of said pin with respect to the axis of the shaft comprising a collar mounted in the shaft and through which the pin extends in accurate fashion, and a pair of opposing screws in the shaft working on opposite sides of the collar, substantially as described.

4. In a boring bar the combination of a shaft having a transverse slot with radial end walls, a tool block seated within said slot and fully occupying the axial dimension of the slot, a pair of cutting tools mounted within the tool block, means within the tool block for adjusting said tools towards and from each other, means within the tool block for locking the tools, there being a transversely extending hole in the shaft communicating axially with the transverse slot, there being a tapered recess in the face centrally of the tool block in position to register with said hole, a centering pin extending loosely through the hole and having its inner end tapered and adapted to wedge into the recess of the tool block and having its outer end loosely in threaded engagement with the shaft, means for exactly centering the position of said pin with respect to the axis of the shaft comprising a collar mounted in the shaft and through which the pin extends in accurate fashion, and means for adjusting the position of said collar within the shaft, substantially as described.

5. In a boring bar the combination of a shaft having a transverse slot, a tool block seated within said slot and fully occupying the axial dimension of the slot, cutting tools mounted within the tool block, there being a transversely extending hole in the shaft communicating axially with the transverse slot, and having a tapered recess in the face centrally of the tool block in position to register with said hole, a centering pin extending loosely through the hole and having its inner end tapered and adapted to wedge into the recess of the tool block and having its outer end loosely in threaded engagement with the shaft, means for exactly centering the position of said pin with respect to the axis of the shaft comprising a collar mounted in the shaft and through which the pin extends in accurate fashion, means for adjusting the position of said collar within the shaft, substantially as described.

6. In a boring bar the combination of a shaft having a transverse slot, a tool block seated within said slot, there being a transversely extending hole in the shaft communicating axially with the transverse slot, there being a tapered recess in the face centrally of the tool block in position to register with said hole, a centering pin extending loosely through the hole and having its inner end tapered and adapted to wedge into the recess of the tool block and having its outer end loosely in threaded engagement with the shaft, and means for exactly centering the position of said pin with respect to the axis of the shaft comprising guide means for the pin, said guide means being laterally adjustable with respect to the shaft, substantially as described.

7. In a boring bar the combination of a shaft having a transverse slot, a tool block seated within said slot, suitable tools in the tool block, and means for locking the tool block and centering the tools comprising a pin threading through the shaft and into engagement with the face of the tool block, together with means for guiding said pin, said guiding means being laterally adjustable with respect to the shaft, substantially as described.

8. In a boring bar the combination of a shaft having a transverse slot, a tool block within said slot, suitable cutting tools carried by said tool block, a pin threaded through the shaft, a tapered head on the inner end of said pin, there being a tapered socket in the face of the tool block for the accommodation of said head, there being an axial recess in the hole of the shaft through which the pin extends, and there being an axial recess in the end portion of the pin adapted to at times register with the first mentioned recess, substantially as described.

9. In a boring bar the combination of a shaft having a transverse slot, a tool block seated within said slot and having a transverse slot, one end wall of the slot of the tool block being radial, and the other end wall of the slot of the tool block extending at an angle of substantially 36° 52′ 8″ with respect to the first end wall of said slot, a pair of cutting tools seated against one of the end walls of the slot, and means for adjusting the position of said cutting tools towards and from each other comprising a scroll plate having on its face adjacent to the tools a spiral groove, and suitable projections on the tools adapted to engage said groove, there being markings on the face of the scroll plate designating amounts of change in cutting diameter of the tools when seated against the angular face of the slot, whereby when the cutting tools are seated against the radial face of the slot the amount of change of cutting diameter will be indicated by the same markings on the scroll plate when multiplied by 1.25, substantially as described.

10. In a boring bar the combination of a tool carrying element having a transverse slot, one end wall of the slot being radial and the other end wall of the slot extending at an angle of substantially 36° 52′ 8″ with respect to the first end wall of the slot, a pair of cutting tools seated against one of the end walls of the slot, and means for adjusting the position of said cutting tools towards and from each other comprising a scroll plate having on its face adjacent to the tools a spiral groove, and suitable projections on the tools adapted to engage said groove, there being markings on the face of the scroll plate designating amounts of change in cutting diameter of the tools when seated against the angular face of the slot, whereby when the cutting tools are seated against the radial face of the slot the amount of change of cutting diameter will be indicated by the same markings on the scroll plate when multiplied by 1.25, substantially as described.

11. In a boring bar the combination of a tool carrying element having a transverse slot, one end wall of the slot being radial and the other end wall of the slot extending at an angle of substantially 36° 52′ 8″ with respect to the first end wall of the slot, a pair of cutting tools seated against one of the end walls of the slot, and means for adjusting the position of said cutting tools towards and from each other comprising a scroll plate having on its face adjacent to the tools a spiral groove, substantially as described.

ALAN E. VOSBURG.
ROBERT B. WHITNEY.